A. D. PLOWDEN.
BAND SAW.
APPLICATION FILED OCT. 3, 1913.

1,109,458.

Patented Sept. 1, 1914.

Witnesses
Henry B. Byrd
R. M. Smith

Inventor
A. D. Plowden
By Victor J. Evans
Attorney

UNITED STATES PATENT OFFICE.

ARTHUR D. PLOWDEN, OF MELBOURNE, FLORIDA.

BAND-SAW.

1,109,458. Specification of Letters Patent. Patented Sept. 1, 1914.

Application filed October 3, 1913. Serial No. 793,218.

*To all whom it may concern:*

Be it known that I, ARTHUR D. PLOWDEN, a citizen of the United States, residing at Melbourne, in the county of Brevard and State of Florida, have invented new and useful Improvements in Band-Saws, of which the following is a specification.

This invention relates to band saws, the object of the invention being to produce a saw blade which may be operated with far greater safety than the ordinary saw blade now in common use in that there will be very little tendency for the saw blade to be pushed off the wheels by coming in contact with projections on the work, particularly when the work is being returned to the initial end of the sawing stroke.

With the above and other objects in view, the invention consists in the construction, combination and arrangement of parts, as will hereinafter be more fully described, illustrated and claimed.

Figure 1:
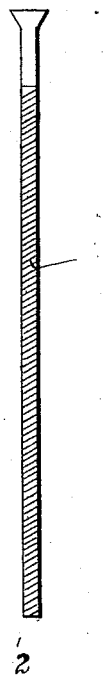
Figure 2:
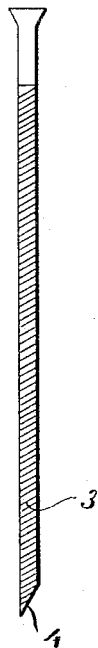

In the accompanying drawings:—Figure 1 is a cross section through a band saw of the kind now in common use. Fig. 2 is a similar view of a band saw constructed in accordance with the present invention.

Referring to the drawings 1 designates the saw blade now in common use the same having the rear edge 2 thereof of the full width or thickness of the blade.

3 designates the saw blade of this invention and it will be observed that the rear edge of said blade is chamfered or beveled as shown at 4, the bevel occurring on that side which is next to the log or stock from which a plank, for example, is being cut by the saw.

It is well understood that in the reverse movement of the saw carriage to the point where a cut is commenced, there is considerable danger of slabs or slivers on the log catching against the back edge of the saw and dragging the saw off the wheels of the band saw machine around which the saw runs. This results frequently in great damage to the saw, to the mill and also involves injury to by-standers and employees and the liability of such accidents causes the operator to exercise considerable care in feeding the carriage back and forth as he must always be on the watch out for a contingency of the kind referred to. The result of this is a considerable loss of time owing to the great care necessarily exercised by the workmen.

In the case of slivers which are of the most frequent occurrence, the nature of a sliver is to start with a small amount of projection insufficient in itself to pull a saw off the wheels but said sliver increases or bulges more and more and the straight back saw necessarily cuts deeper and deeper into the bulge caused by the projecting sliver until a shoulder is formed which drags the saw off its wheels. With the saw of this invention having the beveled rear edge, the tendency is for the saw to ride outwardly on the bulging portion of the sliver until said bulging portion passes by the saw when it will return to its normal line of travel without causing any damage and without dishing or otherwise injuring the saw blade. The bevel may be easily ground on the back edge of the saw blade while the saw is running, by holding a suitable abrading implement against the same or the saw may be. primarily manufactured with the bevel at the factory.

What I claim is:—

A band saw blade having the rear edge thereof straight on the side remote from the work and beveled on the side next to the work to be sawed so as to tend to run out of the work.

In testimony whereof I affix my signature in presence of two witnesses.

ARTHUR D. PLOWDEN.

Witnesses:
 JACK W. FARLEY,
 J. F. CAMPBELL.

Copies of this patent may be obtained for five cents each, by addressing the "Commissioner of Patents, Washington, D. C."